United States Patent [19]

Gottesman

[11] Patent Number: 4,562,083
[45] Date of Patent: Dec. 31, 1985

[54] DECAFFEINATION OF GREEN COFFEE WITH N-BUTYL ACETATE

[75] Inventor: Martin Gottesman, Paramus, N.J.

[73] Assignee: General Foods Corporation, White Plains, N.Y.

[21] Appl. No.: 710,357

[22] Filed: Nov. 19, 1984

Related U.S. Application Data

[63] Continuation-in-part of Ser. No. 166,647, Jul. 7, 1980, abandoned.

[51] Int. Cl.[4] .......................... A23F 5/20; A23F 5/22
[52] U.S. Cl. .................................... 426/424; 426/428
[58] Field of Search .................... 426/424, 427, 428; 544/274

[56] References Cited

U.S. PATENT DOCUMENTS

| | | | |
|---|---|---|---|
| 1,742,261 | 1/1930 | Klein | 426/428 |
| 2,016,634 | 10/1935 | Grethe | 426/428 X |
| 2,309,092 | 1/1943 | Berry et al. | 426/424 |
| 2,391,981 | 1/1946 | Kremers | 426/428 X |
| 3,682,648 | 8/1972 | Mitchell et al. | 426/428 |
| 3,879,569 | 4/1975 | Vitzhuin et al. | 426/428 X |
| 4,087,562 | 5/1978 | Jones et al. | 426/428 |
| 4,255,458 | 3/1981 | Roselius et al. | 426/428 X |
| 4,256,774 | 3/1981 | Strobel et al. | 426/428 |

OTHER PUBLICATIONS

Hawley, The Condensed Chemical Dictionary, 9th Ed., 1977, Van Nostrand Reinhold Co.: New York, p. 133.
"The Merek Index", 8th Ed., 1968, Merek & Co., Inc.: Rahway, N.J., p. 188.
Straten et al, Volatile Compounds in Foods, 4th Ed., 1977, Central Institute for Nutrition and Food Research, The Netherlands, p. 72.3.

*Primary Examiner*—Joseph Golian
*Attorney, Agent, or Firm*—Basam E. Nabulsi; Joseph T. Harcarik; Daniel J. Donovan

[57] ABSTRACT

Green coffee may be decaffeinated by extracting caffeine from either green coffee or an aqueous extract of green coffee by means of n-butyl acetate. Improved selectivity for caffeine is evidenced by n-butyl acetate, thereby improving the organoleptic quality of the decaffeinated coffee by selectively removing caffeine without extracting a significant amount of non-caffeine solids.

8 Claims, 1 Drawing Figure

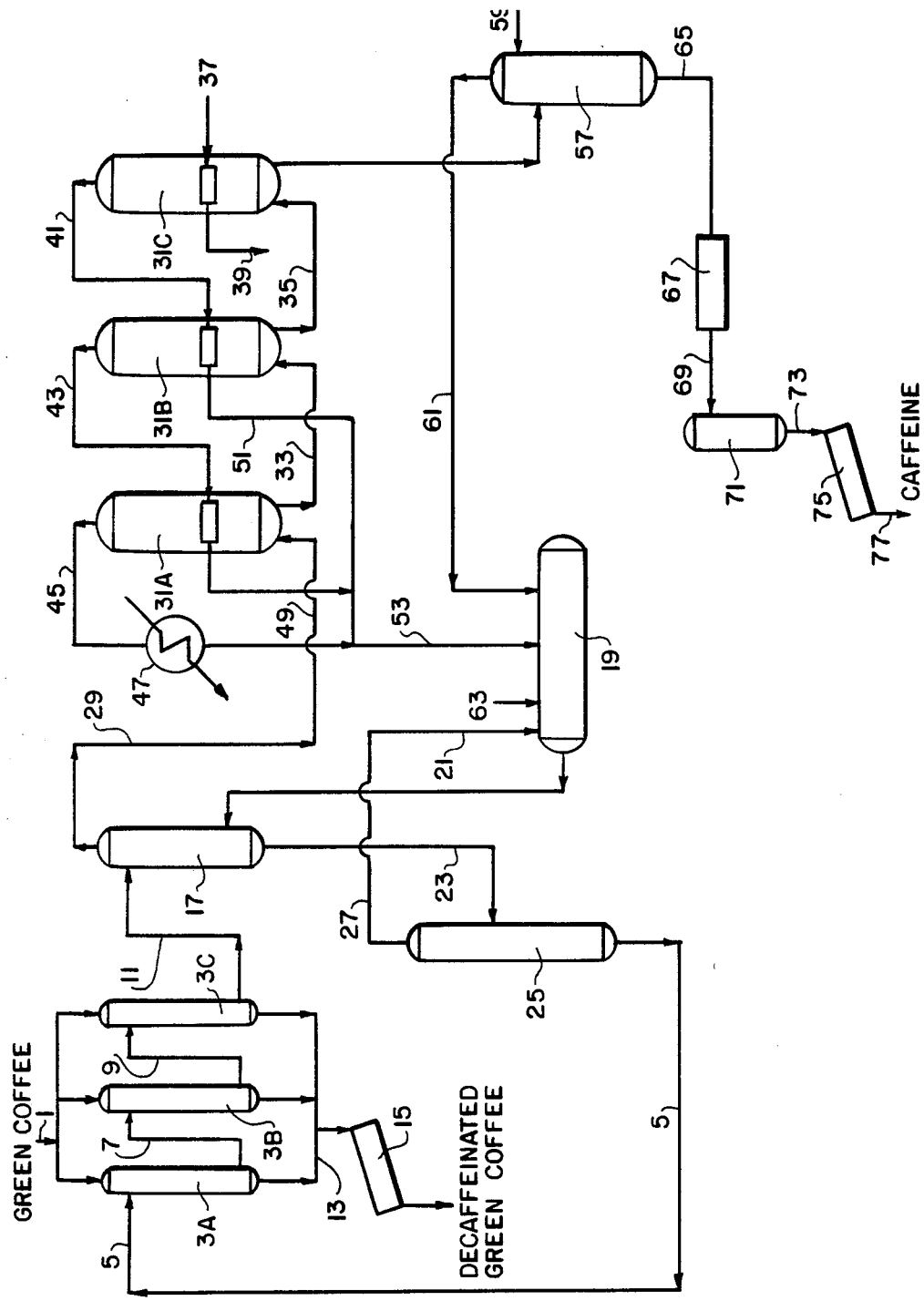

DECAFFEINATION OF GREEN COFFEE WITH N-BUTYL ACETATE

This case is a continuation-in-part of Ser. No. 166,647, filed July 7, 1980 and now abandoned.

FIELD OF THE INVENTION

This invention relates to a decaffeination process. More particularly, it relates to the decaffeination of green coffee or an aqueous extract of green coffee. This invention especially relates to the use of n-butyl acetate as a solvent for green coffee decaffeination.

DESCRIPTION OF THE PRIOR ART

Current commercial decaffeination of coffee is effected by the removal of caffeine from whole, green coffee beans. The beans are moistened and then extracted with a solvent which is relatively specific for caffeine. The solvents employed commercially are either a chlorinated hydrocarbon solvent, such as discussed in U.S. Pat. No. 3,671,263 to Patel et al. or a caffeine-deficient water solution of coffee solubles, such as disclosed in U.S. Pat. No. 2,309,092 to Berry et al. both of which are incorporated herein by reference.

In the decaffeination process of U.S. Pat. No. 2,309,092, which is commonly referred to as the water extraction system (Note: Sivetz, Coffee Processing Technology, Vol. 2, p. 208, AVI Publishing Co., Inc., 1963), the caffeine laden water extract, resulting from contact between caffeine-containing green coffee and the caffeine-deficient water solution, is solvent extracted in order to remove caffeine. Typically these solvents are the same chlorinated hydrocarbons, such as, methylene chloride, trichloroethylene and chloroform, which are employed in the direct solvent extraction processes, exemplified by the aforementioned U.S. Pat. No. 3,671,263.

Other decaffeination processes are directed to the decaffeination of aqueous extracts of roast and ground coffee rather than green coffee. In general, these methods involve the preparation of an aqueous extract of roast and ground coffee and the decaffeination of the extract by the utilization of a water-insoluble solvent for caffeine. The decaffeinated extract can be utilized in the preparation of soluble coffee while the caffeine can be recovered from the immiscible solvent, both by conventional means. A variety of solvents have been disclosed for the processing of R&G aqueous extracts. Liquid fatty materials, such as safflower oil, soybean oil, corn oil and the like (Belgian Pat. No. 835,556 and Belgian Improvement Patent No. 848,635), methylene chloride (U.S. Pat. No. 2,933,395 to Adler et al. and Belgian Pat. No. 865,488) and ethyl acetate (French Pat. No. 1,591,756 and Belgian Pat. No. 865,488) have been disclosed as effective solvents for the caffeine in aqueous extracts of roast and ground coffee.

Green coffee decaffeination with diethyl succinate is disclosed in U.S. Pat. No. 4,087,562 to Jones et al. where this caffeine solvent may be employed in either a direct or indirect extraction process while the use of fluorinated hydrocarbons is limited to the direct decaffeination of green coffee beans in U.S. Pat. No. 3,669,679 to Panzer et al.

As a result of the presence of organic solvents, such a chlorinated hydrocarbons, in commercial green bean decaffeination processes, the decaffeinated coffee products presently being sold, either roasted and ground or soluble, contain at least trace amounts of residual solvent. Since presence of chlorinated, or other halogenated compounds in food products is becoming the subject of increased governmental regulation, it would be desirable to identify and employ a non-halogenated solvent for the decaffeination of coffee.

The main feature of any system of decaffeinating coffee, such as in the decaffeination of whole green coffee beans, is to identify a non-toxic solvent in which caffeine is readily soluble and in which non-caffeine coffee solids are insoluble or poorly soluble and which solvent can be removed from the coffee without deteriorating or materially changing the chemical composition of the bean.

It is an object of this invention to provide a decaffeination process for green coffee.

It is another object of this invention to provide a process for decaffeinating coffee which eliminates the direct or the indirect use of halogenated organic solvents.

SUMMARY OF THE INVENTION

This invention is directed towards methods for decaffeinating green coffee beans, which employ n-butyl acetate as an organic non-halogenated solvent for caffeine. n-Butyl acetate can be used to either directly remove caffeine from the green coffee material or to remove caffeine from an aqueous extract of green coffee.

More particularly, this invention is directed to a method of decaffeinating green coffee which comprises:

(a) moistening green coffee, (b) contacting the moistened green coffee with n-butyl acetate for a period of time effective for transferring caffeine from the coffee to the n-butyl acetate, and (c) separating the n-butyl acetate from the decaffeinated green coffee.

This invention is also directed to a method of decaffeinating green coffee which comprises:

(a) contacting green coffee with a decaffeinated aqueous extract of green coffee for a period of time effective for transferring caffeine from the coffee to the aqueous extract, (b) separating the aqueous extract from the decaffeinated green coffee, (c) contacting the caffeine-containing aqueous extract of step (b) with n-butyl acetate for a period of time effective for transferring caffeine from the caffeine-containing aqueous extract to the n-butyl acetate, and (d) steam stripping the aqueous extract to remove residual solvent, (e) recycling the decaffeinated aqueous extract of step (c) to step (a).

n-Butyl acetate is useful for extracting caffeine as it is stable to chemical deterioration over the temperature and pH ranges normally employed in decaffeination, is essentially insoluble in water and possesses a non-noxious odor. The solubility of caffeine in n-butyl acetate is substantially equivalent to that in trichloroethylene (1.04 v. 1.0 gms./100 cc.).

n-butyl acetate is particularly advantageous for decaffeinating a caffeine-containing aqueous extract because n-butyl acetate has a limited solubility in water. Additionally, water has a limited solubility in n-butyl acetate. These two facts enable the separation of n-butyl acetate from water after completion of the decaffeination step with relative processing ease, thereby greatly improving the efficiency of an n-butyl acetate decaffeination system.

n-butyl acetate demonstrates a high selectivity for caffeine, particularly when compared to other available caffeine solvents. A high caffeine selectivity contributes to improved organoleptic characteristics in the decaffeinated coffee because valuable non-caffeine solids are not extracted by n-butyl acetate during the decaffeination process. As is widely recognized in the decaffeination art, preservation of non-caffeine solids in decaffeinated coffees is extraordinarily important to coffee flavor impact and balance.

Finally, n-butyl acetate is a relatively safe solvent for caffeine extraction, being non-explosive and having no lethal dosage 50 rating.

Preferably decaffeination is carried out as a semi-continuous countercurrent operation in a battery operation such as described in the aforementioned Patel et al. and Berry et al. patents. Typically the overall decaffeination process involves moistening the coffee, extracting caffeine from the coffee, stripping residual solvent from the coffee in the case of a direct solvent extraction system, and from the solvent extracted water extract in the case of a water extraction system, and finally drying and cooling the coffee. These basic steps are all well known in the decaffeination art.

BRIEF DESCRIPTION OF THE DRAWING

The present invention will be more readily understood by reference to the accompanying drawing which is a flowplan of one of the preferred embodiments of the invention.

DESCRIPTION OF THE INVENTION

In the process of this invention, the green coffee is moistened or wetted. This moistening will occur as a pre-wetting step by means of steam and/or water in a direct solvent system, and as an inherent aspect of the initial portion of the water extraction system. The moistened coffee is contacted with a caffeine solvent which may be either n-butyl acetate or a caffeine-deficient aqueous extract of green coffee which has been decaffeinated by means of n-butyl acetate. Solvent residues in the decaffeinated beans will be kept to a low level by means of stripping (e.g., steam stripping) the solvent-decaffeinated beans or the solvent-decaffeinated water extract. Usually the decaffeinated coffee is then cooled and dried; however, as the green coffee must eventually be roasted, it is possible to eliminate the cooling and/or drying steps and to directly send the decaffeinated coffee to a roaster. The roasted coffee is suitable for use as either regular coffee or for extraction in making soluble coffee.

The moistening operation involves uniformly incorporating water in the green coffee. This water is thought to swell the coffee, solubilize the caffeine and, in general, to render the green coffee caffeine-extractable. Moistening can be accomplished by adding water and mixing the coffee, by using humidified air or other gases, and/or by employing steam. The particular method employed for moistening the bean is not critical, so long as a uniform and relatively even penetration of water is obtained throughout the coffee. Coffee may be moistened to any desired degree, but it has been found that the greater the moisture content of the coffee, the more rapid is the caffeine extraction employing a given solvent. Thus, while moisture contents of about 15 to over 50% may be employed in the practice of the present invention, it is preferable to extract green coffee having a moisture content greater than 30% water, and more preferably greater than 40% water. Generally, when direct organic solvent decaffeination is employed, an initial steaming step will be combined with a pre-wetting step in order to achieve the desired moisture level. Such a procedure is set forth in the aforementioned Patel et al. patent which also notes that all or part of the pre-wetting water can be added simultaneously with the organic solvent. When a water decaffeination system is used, such as that of Berry et al., a separate moistening step is not necessary since the moisture level of the coffee will be raised, as a matter of course, during contact with the aqueous extraction medium.

Extraction of the green coffee can either be by batch, semi-continuous or continuous operation. Important parameters are the desired decaffeination level, the quantity of solvent employed, and the temperature of the solvent. In accordance with the present invention, the solvent employed is either n-butyl acetate or a caffeine-deficient water solution of green coffee solubles, commonly referred to as "lean green extract", which solution has been decaffeinated by means of n-butyl acetate. Extraction is accomplished by contacting the green coffee with the solvent for a period of time sufficient to remove the desired amount of caffeine. During extraction, temperatures should be maintained at low levels, and the time of extraction maintained as short as possible to reduce flavor changes in the green beans and, of course, to reduce processing costs. It is preferred to maintain the extraction solvent at a temperature from 0° C. to 100° C. The ratio of solvent-to-bean employed during extraction is selected to insure rapid caffeine removal while maintaining the amount of solvent to be stripped of caffeine, water and non-caffeine solids at an economical level.

n-butyl acetate has been found to be a particularly effective caffeine solvent, as evidenced by its selectivity for caffeine. Specificity is a measure of selectivity and, as used herein, means the weight ratio of non-caffeine solids to caffeine extracted to the caffeine solvent during decaffeination. Thus, a low specificity value indicates a high selectivity for caffeine. Further, a low specificity value suggests a better quality decaffeinated coffee will result because fewer non-caffeine solids are being lost to the caffeine solvent. n-butyl acetate has been found to have a specificity of 0.9 as compared, for example, to ethyl acetate which has a specificity of 2.0. The lower specificity and thus higher selectivity of the n-butyl acetate translates to more than a 50% reduction in the non-caffeine solids lost to the caffeine solvent during decaffeination versus ethyl acetate.

After the desired degree of decaffeination is achieved, the green coffee is separated from the solvent, and, in the case of direct-solvent extraction, stripped of residual n-butyl acetate. The beans may then be dried by any conventional means to prevent degradation during subsequent storage. The particular drying step employed should be such to minimize the heat effect on the decaffeinated moist green coffee.

In addition to the basic steps employed during extraction, the caffeine contained in the n-butyl acetate is usually separated from the solvent by conventional techniques, such as evaporation and/or liquid-liquid extraction and crystallization. Usually the recovered solvent will be recycled to again extract caffeine and the separated caffeine may be further purified. A suitable process would be to initially evaporate most of the solvent, to then add water and evaporate residual solvent. Caffeine may then be crystallized from the water solution.

The preferred method of practicing this invention includes a semi-continuous water decaffeination system such as described in Berry et al.'s U.S Pat. No. 2,309,092. Caffeine is extracted with an aqueous extraction liquid from green coffee contained in a battery of extraction columns connected in series. At steady-state operation, the extraction columns contain green coffee of varying degrees of extraction and the process is countercurrent in operation.

During operation, the "lean green" extraction liquid is fed to the extraction column containing the most extracted green coffee, is passed through the coffee extracting caffeine therefrom, and then is passed out of the column into the extraction column containing the next most extracted green coffee in the battery. In this manner, the extraction liquid passes through green coffee of increasing freshness, thereby increasing in caffeine content, and is drawn-off from the extraction column containing the least extracted coffee in the battery for this cycle (one cycle being the period between successive draw-offs of extraction liquid from the fresh column). The "rich green" extraction liquid is then processed to remove caffeine in accordance with this invention.

As taught by Berry et al., in beginning a new cycle, the most extracted green coffee in the previous cycle is discharged from the extraction column and is in the desired final decaffeinated form. This coffee is then further processed into roasted and ground coffee or soluble coffee according to methods well-known in the art. The "lean green" extraction liquid is then fed to the column containing the most extracted green coffee for this cycle, this coffee being the next most extracted coffee from the previous cycle, and the extraction process continues with the caffeine-laden, "rich-green" extraction liquid being drawn off after contacting the freshest green coffee which is generally previously unextracted green coffee. Cycles are continued in this manner such that in each succeeding cycle a given column of green coffee becomes progressively more extracted and hence more deficient in caffeine, In Berry et al., the aqueous extraction liquid, fed to the first extraction column in the battery containing the most extracted green coffee, is a water solution of green coffee solubles other than caffeine. In this manner, a continuous dynamic equilibrium is substantially maintained between the solids (other than caffeine) in the green coffee and the solids in the extraction liquid. This equilibrium inhibits the net loss of green coffee solubles from the coffee to the surrounding water and, hence, the final decaffeinated green coffee is found to contain nearly the normal amount of solubles other than caffeine.

Of course, as the extraction liquid passes through the battery of extraction columns, it will become progressively more caffeine-laden. While many varying concentrations of these green coffee solubles in the extraction liquid may be employed, the concentrations and other operating factors are generally chosen so as to achieve, as nearly as possible, the dynamic equilibrium previously referred to.

The equilibrium between the soluble solids in the green coffee and the soluble solids in the extraction liquid works to minimize any concentration gradients of these materials and thereby hinders net mass transfer from the coffee to the surrounding liquid. Since caffeine is not initially present in the extraction liquid, a suitable gradient is present to effect extraction of the caffeine from the green coffee into the extraction liquid. In actuality, the dynamic equilibrium is more aptly described as equal rates of mass transfer. Thus while the net ideal result is to substantially prevent a reduction of the original amount of solubles other than caffeine in the green coffee, such prevention is the result of a combination of preventing natural solubles loss from the green coffee coupled with replacement of solubles from the extraction liquid at a rate equal to the rate of solubles lost from the green coffee.

In the Berry et al. patent, the aqueous extraction liquid drawn off from the extraction column containing the least extracted green coffee (i.e., "rich green extract") contains caffeine and green solubles which were either present in the original feed liquid or extracted from the green coffee. The extraction liquid is stripped of caffeine by means of a solvent, and the caffeine-containing solvent is removed from the aqueous extract. The essentially caffeine-free ("lean green") aqueous extract may then be recycled, usually with the addition of water, and after steam stripping to the battery of extraction columns.

According to this invention, the rich green extract is decaffeinated by means of n-butyl acetate. Preferably, direct contact between rich green extract and n-butyl acetate in a liquid-liquid extractor, such as rotating disk contactor, is employed; however, indirect contact methods such as ultrafiltration or dialysis may likewise by employed.

The removal of the caffeine-containing n-butyl acetate from the aqueous extract described above is particularly efficient because of the limited solubility of n-butyl acetate in water and, conversely, of water in n-butyl acetate. At 50° C., butyl acetate is soluble in water at a level of 4.0% as compared, for example, to ethyl acetate which is soluble at 8.3%. Conversely, water is soluble in butyl acetate at 1.8%, whereas water is soluble in ethyl acetate at 5.1%. Such low solubilities greatly increase the ease of separation, thereby improving the processing efficiency of a decaffeination system using n-butyl acetate, particularly when compared to ethyl acetate.

n-butyl acetate is also extemely advantageous as a caffeine solvent for safety reasons. n-butyl acetate is flammable as compared, for example, to ethyl acetate which is explosive. n-butyl has a flash point of 72° F. as compared to ethyl acetate which flashes at 24° F. n-butyl acetate has no lethal dosage 50 ($LD_{50}$) value as compared to ethyl acetate which has an $LD_{50}$ of 11.3 g/kg. The desirablity of a caffeine solvent with the safety characteristics of n-butyl acetate sould be readily apparent to one skilled in the art.

The following example demonstrates the practice of the invention.

EXAMPLE

An embodiment of this invention may be understood from the following detailed description taken with reference to the drawing which is a flowplan illustrating and exemplifying a means by which the process of the present invention may be practiced.

Green coffee beans are decaffeinated in a semi-continuous system as described in Berry et al.'s U.S. Pat. No. 2,309,092 which is summarized hereinabove. Green beans are loaded through line 1 into a battery of extraction columns, 3A, 3B and 3C, connected in series. Although only three of the extraction volumes are illustrated here, those skilled in the art will appreciate that the total number of columns required for a given installation will be dictated by a variety of factors, including the degree of decaffeination desired, the source and quality of the green coffee, the quantity of coffee being treated, the cycle time per column, number of shifts per week, etc. The extraction columns contain green coffee with each column being in a different degree of extraction. "Lean" aqueous extract stream, recycled from a downstream purification operation, flows through the battery of extraction columns in countercurrent fashion at about 46 gpm. The lean aqueous extract has an equilibrium solids concentration of about 23.0% and a residual caffeine concentration of no more than 0.01%. It passes through line 5 into column 3A which contains the green coffee which has been extracted the most. The aqueous extract passes through the column extracting caffeine from the coffee, exits through line 7 and into column 3B which contains the next most extracted coffee beans. The extract flows through this column and continues in this fashion, through line 9 and column 3C as well as any other extraction columns connected in series. The aqueous extract passes through green coffee of increasing caffeine content, gradually extracting caffeine as it passes through the battery of extraction columns, thereby increasing in caffeine content until it exits from the last column into line 11 at about 46 gpm and a caffeine concentration of 0.5 to 1.1% depending on the coffee being processed. A 1.0% concentration is quite common.

As the green coffee in the first column in the series of columns reaches the desired level of decaffeination, that column is taken "off-line" and a column containing a fresh batch of green coffee beans is placed onstream as the first column in the series of columns. In the system, as illustrated here, column 3C would be the "newest" column on-line and column 3A would be the one to be taken off-line. Bringing a column on-line and taking one off-line while maintaining a series flow is accomplished by appropriate piping and valving systems (not shown) which are well-known in the art.

After column 3A is removed from the line, the decaffeinated beans are washed with water, e.g., in a known manner (equipment not shown) and removed from the column through line 13 and dried in dryer 15 to produce the desired decaffeinated green coffee beans. These beans are then further processed by procedures well known in the art into regular roast and ground, spray dried instant, agglomerated instant and freeze dried instant decaffeinated products.

Returning to the "rich" green extract, it flows through line 11 at about 46 gpm into a liquid-liquid extraction column 17 (process considerations may require a battery of such extraction columns; three would be usual in this situation). Butyl acetate is supplied to column 17 from solvent feed tank 19 and line 21 at about 239 gpm. The butyl acetate, containing about 3% water, extracts caffeine from the rich aqueous extract at a solvent/extract ratio of 5.2/1 (weight basis). Extraction column 17 is usually operated at a temperature of 175° F. and a pressure of 40 psig. The caffeine depleted extract, which now contains about 3% n-butyl acetate flows from extraction column 17 through line 23 at about 47 gpm to fractionating column 25 which is operated at a minimum tower top temperature of 200° F. to insure that the lean green coffee extract removed as tower bottoms has a solvent residual level of 10 PPB or less. The caffeine lean, essentially solvent-free extract is recycled at about 46 gpm through line 5 to extraction columns 3A, 3B and 3C where it is reused to extract caffeine from green coffee. The overhead from column 25 consisting of about 97% n-butyl acetate and about 3% water flows from the column through line 27 to solvent feed tank 19 for reuse in liquid-liquid extraction column 17.

The caffeine-rich n-butyl acetate solvent stream containing about 0.22% caffeine, 0.12% soluble coffee solids and about 3% water passes from extraction tower 17 through line 29 at about 238 gpm to triple effect evaporator 31-A, B and C which is operated in a backward feed mode. The first effect, 31A, is operated at about 100 mm Hg and a vapor outlet temperature of 100° F., the second effect, 31B, is operated at about 180 mm Hg and a vapor temperature of 170° F. and the third effect, 31C, is operated at about 200 mm Hg and a vapor temperature of 180° F. The caffeine-rich solvent stream flows through line 29 into the first effect, 31A. After being concentrated in 31A it flows through line 33 for further concentration in the second effect, 31B, and then through line 35 into the third effect, 31C, for final concentration. Steam is introduced through line 37 to supply heat to the third effect, 31C. Steam condensate is removed through line 39. Vapors from 31C pass through line 41 to supply heat to the second effect, 31B, while vapors from 31B pass through line 43 to supply heat to the first effect, 31A. The vapors from the first effect, 31A, pass through line 45 and are condensed in condenser 47. The condensates from the second, 31B, and the third, 31C, effects flow through lines 49 and 51, respectively, and are combined with the condensate from condenser 47. These combined condensates, consisting of 97% n-butyl acetate and 3% water, flow through line 53 at about 211 gpm to solvent feed tank 19 for reuse.

The caffeine-rich product from the triple effect evaporator consists of n-butyl acetate containing about 2% caffeine and about 1% soluble coffee solids. This product flows from the third effect, 31C, through line 55 at about 27.3 gpm to caffeine transfer column 57. Water at about 2.6 gpm is supplied to the transfer column through line 59. In transfer column 57, n-butyl acetate is evaporated, condensed and returned caffeine-free but containing 3% water through line 61 at about 26.8 gpm to solvent feed tank 19. Make-up n-butyl acetate is supplied, as needed, to solvent feed tank through line 63.

Caffeine rich water containing about 17% caffeine and about 9% coffee solids passes from transfer column 57 through line 65 for purification and recovery. This caffeine rich stream passes through filter 67, then line 39 and into crystallizer 71. As the caffeine crystals collect in the bottom of crystallizer 71, they are recovered and pass through line 73 to dryer 75. Refined and dried caffeine is recovered from the dryer through line 77. In the process described, about 130 pounds per hour of caffeine are recovered and 6,300 pounds per hour of decaffeinated green coffee are produced.

I claim:

1. A method of decaffeinating green coffee which comprises:
   (a) moistening green coffee,
   (b) contacting the moistened green coffee with n-butyl acetate for a period of time effective for transferring caffeine from the coffee to the n-butyl acetate, and (c) separating the n-butyl acetate from the decaffeinated green coffee.

2. A method according to claim 1 including the following additional step:
(d) roasting the decaffeinated green coffee.

3. A method according to claim 1 including the following additional steps:
(e) recovering caffeine from the n-butyl acetate, and
(f) recycling the decaffeinated n-butyl acetate to step (b).

4. A method according to claim 3 wherein step (e) comprises:
(i) contacting the caffeine-containing n-butyl acetate with water for a period of time effective to transfer caffeine from the n-butyl acetate to the water,
(ii) cooling the aqueous solution of caffeine to effect crystallization of the caffeine, and
(iii) recovering the crystals of caffeine from the aqueous solution.

5. A method of decaffeinating green coffee which comprises:
(a) contacting green coffee with a decaffeinated aqueous extract of green coffee for a period of time effective for transferring caffeine from the coffee to the aqueous extract,
(b) separating the aqueous extract from the decaffeinated green coffee,
(c) contacting the caffeine-containing aqueous extract of step (b) with n-butyl acetate for a period of time effective for transferring caffeine from the caffeine-containing aqueous extract to the n-butyl acetate,
(d) steam stripping the aqueous extract to remove residual solvent, and
(e) recycling the decaffeinated aqueous extract of step (c) to step (a).

6. A method according to claim 5 including the following additional step:
(f) roasting the decaffeinated green coffee.

7. A method according to claim 5 including the following additional steps:
(g) recovering caffeine from the n-butyl acetate, and
(h) recycling the decaffeinated n-butyl acetate to step (c).

8. A method according to claim 7 wherein step (f) comprises:
(i) contacting the caffeine-containing n-butyl acetate with water for a period of time effective to transfer caffeine from the n-butyl acetate to the water,
(ii) cooling the aqueous solution of caffeine to effect crystallization of the caffeine, and
(iii) recovering the crystals of caffeine from the aqueous solution.

* * * * *